June 23, 1959 M. M. CARPENTER, JR 2,892,027

SYSTEM FOR INCREASING SIGNAL TO NOISE RATIO OF PICKUP TUBES

Filed April 28, 1953 2 Sheets-Sheet 1

INVENTOR.
MARSHALL M. CARPENTER, Jr.
BY
Harry M. Saragovitz
Attorney

June 23, 1959 M. M. CARPENTER, JR 2,892,027

SYSTEM FOR INCREASING SIGNAL TO NOISE RATIO OF PICKUP TUBES

Filed April 28, 1953 2 Sheets-Sheet 2

INVENTOR.
MARSHALL M. CARPENTER, Jr.
BY
Harry M. Saragovitz
Attorney 2,892,027

SYSTEM FOR INCREASING SIGNAL TO NOISE RATIO OF PICKUP TUBES

Marshall M. Carpenter, Jr., Princeton, N.J., assignor to the United States of America as represented by the Secretary of the Army Application April 28, 1953, Serial No. 351,698

7 Claims. (Cl. 178—7.2)

This invention relates to a simplified system for slow speed scanning in a television pickup tube without reduction of the signal-to-noise ratio.

As the band-width is decreased with slow speed scanning of a camera tube, the resistance of the load resistor of the camera tube must be increased proportionally to maintain the signal-to-noise ratio, a large drop in signal band width requiring a load resistor with prohibitively high resistance. The actual load resistance for the camera tube is limited by the grid impedance of the first amplifier tube, which is effectively in parallel with the load resistor, and this grid impedance has a finite value of the order of megohms. Therefore, too large an increase in the resistance of the camera tube load resistor will not appreciably affect the actual resistance load on the camera tube.

To allow slow speed scanning and yet preserve the signal-to-noise ratio, pulsed beam operation is employed. Briefly, the present invention comprises a system wherein, in order to extract the video information from a pickup tube target, the scanning electron beam is pulsed, and the resulting pulsed output current is converted to a more continuous video signal representative of the optical image on the target.

Accordingly, it is an object of this invention to provide a system wherein slow speed scanning of a pickup tube may be utilized without the usual decrease in signal-to-noise ratio.

An additional object of the invention is to provide a system wherein pulsed beam operation of a pickup tube may be employed.

Another object of the invention is to provide a novel system for obtaining video information from a storage type camera tube.

These and other objects of the invention will appear more clearly from a consideration of the following specification when taken in conjunction with the accompanying drawings wherein.

The output current of a camera tube is directly proportional to the discharge time of the charge stored upon the camera target and may be represented as $$i_s = \frac{Q}{dt}$$

wherein $i_s$ represents the output current, Q represents the charge stored, and $dt$ is an element of time. In this equation Q is a factor dependent upon the tube construction and is ordinarily not a variable. It can be seen that as the scanning frequency decreases, the time between scans increases and the signal current drops. In the case of a storage tube not employing electron multipliers, the noise current is determined by the equation given on page 370 of Proceedings of the I.R.E. for August 1940:

$$I_n = 2\sqrt{\frac{KT}{R} f_m \left(1 + \frac{R_T R (\omega_m C)^2}{3}\right)}$$

where $K$=Boltzman's constant
$T$=Temperature in degrees Kelvin
$f_m$=Maximum frequency desired
$R$=Load resistor
$C$=Stray capacitance
$R_T$=Equivalent resistance of tube noise
$\omega_m = 2\pi f_m$ It can be seen that the noise current in this equation will decrease as the sweep frequency is decreased, but only as the square root, while the signal current is decreased directly with a decrease in sweep frequency. Thus, if conventional scanning techniques are used, the signal-to-noise ratio for slower scanning rates will decrease.

It has been found that the scanning electron beam may be pulsed during the scanning time to give pulsed output current comparable to the output current at faster scanning rates for a given position on the tube target. The pulsed output current may then be passed through suitable circuits to recover the video information from the pulses. According to the invention, the number of pulses per scanning line should be at least of the same order as the limiting resolution of the system so that the recovered information will show no loss of resolution, and the pulse width should be as short as possible, preferably less than a microsecond.

Figure 1:
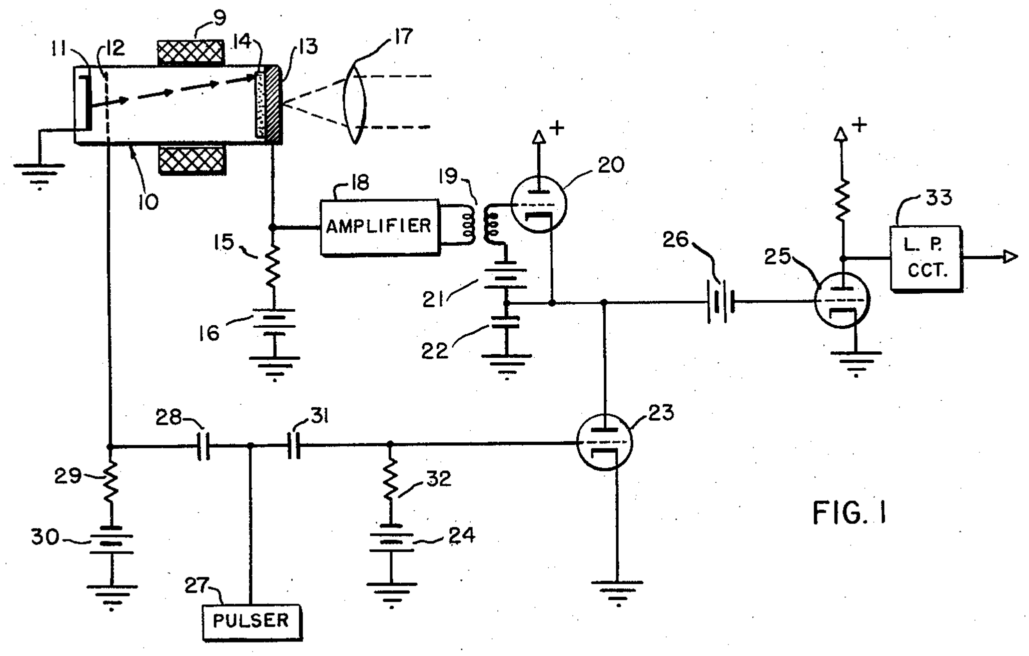
Fig. 1 is a schematic representation of a preferred embodiment of the invention.

Referring to Fig. 1, 10 designates a television camera or pickup tube that utilizes the property of storage, which, for example, may be an Image Orthicon or a Vidicon of the type described in RCA Review, vol. 12, pages 306–313 (September 1951) and vol. 13, pages 3–10 (March 1952). It is assumed for the purposes of this description that the tube is a Vidicon, including a cathode 11, a control grid 12, a signal plate 13, and a mosaic or photolayer target 14. The tube further comprises conventional electron gun elements (not shown) including second and third grids, an alignment coils, a focusing coil, and in addition horizontal and vertical deflecting coils 9. A glass envelope encloses interior elements.

Signal plate 13 is a coating of optically transparent conductive material deposited on the inside of the glass face plate of the Vidicon, and target 14 comprises a layer of photoconductive material, one surface of which is in contact with the signal plate 13. The camera tube is provided with a load resistor 15, one end of which is connected to a source of potential 16, which biases the signal plate 13 approximately ten to fifteen volts positive with respect to the cathode 11, which is grounded.

In operation of the Vidicon, an optical image to be scanned is projected by camera lens 17 through signal plate 13 on to photolayer 14. An electron beam (designated by arrows) from the electron gun is caused to scan the photolayer 14 in a conventional manner (such as a series of horizontal lines) the beam current being maintained sufficiently high to maintain each element of the exposed surface of the photolayer near cathode potential. In the interval between scans, wherever the photolayer has been rendered conductive by the optical image thereon, migration of charge through the photolayer causes the potential of its exposed surface to rise towards that of the signal plate. On the next scan, a sufficient number of electrons is deposited to return the surface to cathode potential. The result is a current which produces across load resistor 15 a voltage drop proportional to the charge built up between scans, fluctuations in this voltage becoming the video signal applied to an amplifier stage 18.

In the embodiment illustrated in Fig. 1, the output of amplifier 18 feeds the primary of a transformer 19, the secondary of which energizes the grid of a triode charging tube 20. A source of negative potential 21 normally renders the triode 20 non-conductive. Charging tube 20 is arranged to charge a condenser 22, one terminal of which is grounded and the other terminal of which is connected to the cathode of the charging tube.

A discharging triode 23, normally rendered non-conductive by negative bias source 24, shunts condenser 22. An output amplifier tube 25 is arranged to receive the potential variations of condenser 22, the control grid of the tube being coupled through a source of negative potential 26 to the ungrounded terminal of the condenser 22, the cathode being grounded as shown. Bias source 26 may be adjusted to render tube 25 non-conductive in the absence of potential on condenser 22 or may be adjusted to bias tube 25 to any conventional point on the tube characteristics. Suitable plate supplies (not shown) are provided for tubes 20 and 25.

A pulser 27, which may comprise any conventional circuit (such as a multivibrator plus suitable pulse shaping circuits) is arranged to apply a series of positive pulses to the control grid 12 of Vidicon 10, through a coupling condenser 28 thereby overcoming a negative bias of approximately 80 volts which is applied to the control grid through a resistor 29 from a source 30. The pulser is also connected to the control grid of discharging tube 23 through a differentiation network which includes condenser 31 and resistor 32. An output circuit, which may include a low pass circuit 33, is connected to the plate of tube 25.

Figure 2:
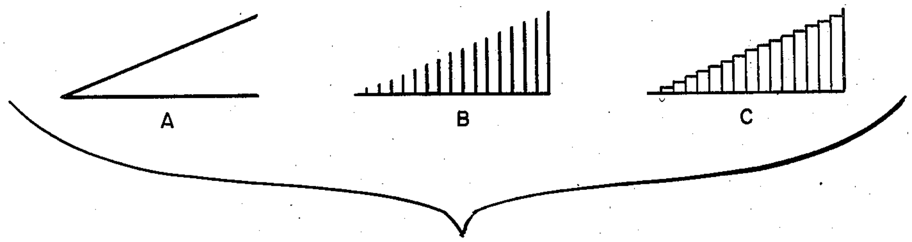
Fig. 2 is a comparative graphical analysis of the operation of conventional systems and the system of the present invention.

To explain the operation of the embodiment of Fig. 1, it is assumed that the camera tube is scanning a linear light wedge (a strip that has variable reflectance along its length varying from light at one end to a very dense black at the other end). Neglecting the pulsing action, the resulting signal output across load resistor 15 would be represented by a sawtooth as indicated in Fig. 2A, that is, each scan of the electron beam would provide a sawtooth of video signal. If pulsed beam operation is utilized, as the electron beam is pulsed on by the pulses from pulser 27 (which overcome the negative bias on the grid 12) the video signal output will appear as a series of variable amplitude spikes (Fig. 2B) instead of as the sawtooth resulting when the beam was not pulsed. These spikes appear across the load resistor 15 and after amplification in amplifier 18 are applied by the transformer 19 to the grid of charging tube 20, overcoming the negative bias of potential source 21. It is evident that as each spike causes the tube 20 to conduct, the condenser 22 charges from the plate supply of tube 20 an amount proportional to the magnitude of the spike, assuming that this magnitude is insufficient to cause saturation of the tube 20. In the interval between spikes, condenser 22 is isolated from its charging source by the non-conductivity of the tube 20.

Were it not for the tube 23, the condenser 22 would maintain its charge between spikes and would store charge cumulatively as the spikes progressed. However, differentiation network 31, 32 causes the leading edge of each pulse from the pulser 27 to be differentiated, thereby forming a sharp positive pulse from each leading edge, and causing the tube 23, which normally is nonconducting, to become conductive. The condenser 22 immediately discharges through the tube 23.

Thus, it will be seen that condenser 22 charges to a potential determined by the magnitude of the spike applied to tube 20, and maintains this charge until immediately before the application of the next spike to the tube 20, at which time the differentiated pulse applied to the tube 23 causes the condenser 22 to discharge completely. The triodes 20 and 23 in combination with the capacitor 22, operate to prolong the duration of the pulses and also to amplify them. The combination may thus be termed a "pulse stretching" circuit or a "pulse integrating" circuit. The output wave applied to tube 25 therefore assumes the configuration illustrated in Fig. 2C. If this wave form is applied to a low pass circuit 33, the wave form in Fig. 2C will approximate that shown in Fig. 2A. It must be remembered, however, that although the final wave form is substantially that obtained through non-pulsed operation, the signal-to-noise ratio will be much higher than may be achieved by conventional scanning. The higher signal-to-noise ratio than otherwise obtainable results from a combination of two factors: (1) the decrease in the camera tube load resistor value necessary to maintain the signal-to-noise ratio at the increased band width required to handle the signal pulses; and (2) the larger magnitude of signal pulses as compared to the signal obtainable by conventional scanning. For a scanning beam of one line per second and limiting camera tube resolution of 600 with a maximum load resistance of 10 megohms, the signal-to-noise ratio is improved by a factor of 83:1 over normal scanning operations.

Figure 3:
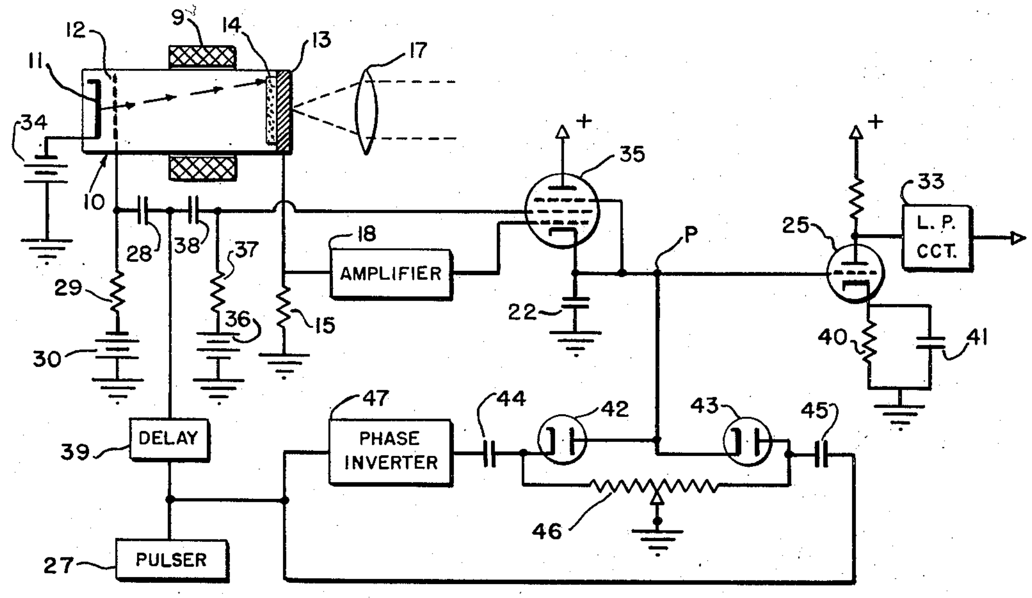
Figs. 3 and 4 are schematic representations of alternative embodiments.

Fig. 3 illustrates an alternative embodiment of the invention, elements corresponding with those in Fig. 1, being designated by the same reference numerals. It will be noted that bias source 16 for the signal plate of Fig. 1 has been replaced by bias source 34 in the cathode circuit of the storage tube 10. Charging triode 20 of Fig. 1 has been replaced by a pentode 35 connected so that the suppression grid is tied to the cathode and the screen grid is connected to pulser 27. A positive bias insufficient to allow tube 35 to conduct is applied to the screen grid from a bias source 36 through a resistor 37, which, with condenser 38 forms a differentiation network. A delay device 39, which may be a conventional delay line, is interposed in the circuit from pulser 27 to the control grid of tube 10 and the screen grid of tube 35. In this embodiment condenser 28 and resistor 29 may also form a differentiation network if it is desired to sharpen the pulses applied to grid 12. (The same is true in Fig. 1 if a delay means is inserted in the circuit to grid 12.) It will further be noted that a self-biasing network comprising a resistor 40 and condenser 41 in the cathode circuit of tube 25 replaces bias source 26 of Fig. 1.

The circuit for discharging condenser 22 differs substantially from the arrangement in Fig. 1. In Fig. 3 a double diode keyed clamp (as described in RCA Review, March 1948, page 101 et seq) is employed. This clamp comprises diodes 42, 43 and RC circuits including condensers 44, 45 and resistance 46, which has a variable tap to ground. A phase inverter 47 is inserted in one branch of the circuit to ensure the application of pulses of the correct polarity to the diode 42.

In operation the condenser 22 is discharged and the potential of point P is brought to ground potential by the application of pulses from pulser 27 to diodes 42, 43 directly before the pulsing of camera tube 10 and charging tube 35. (This may be ensured by the proper placement of the variable tap on resistor 46.) During the interval between pulses, point P is isolated from ground because the RC networks comprising condensers 44, 45 and resistor 46 maintain the diodes 42, 43 non-conductive. Slightly later than the pulsing of the clamp circuit, pulses are applied to the control grid 12 of camera tube 10 and the screen grid of charging tube 35. The pulsing of grid 12 causes a current to flow through resistor 15, while the keying of the screen grid of tube 35 places the pentode in condition to pass a current determined by the potential applied to the control grid by amplifier 18. In this manner the condenser 22 is charged according to the information stored on the camera tube.

Figure 4:
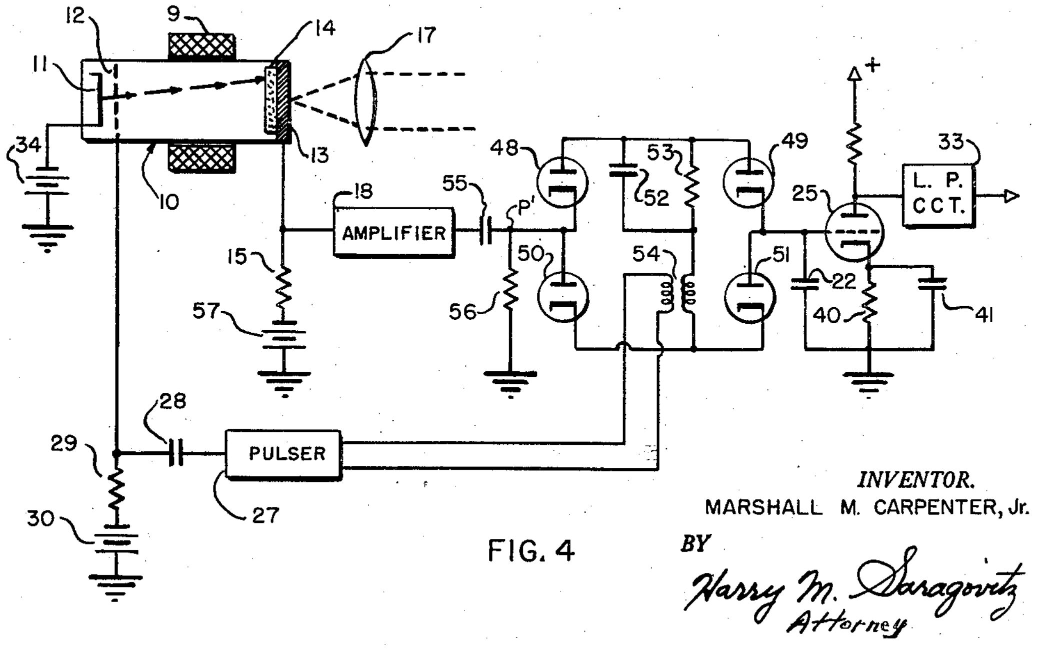

Fig. 4 illustrates a third embodiment of the invention, wherein a keyed four diode clamp circuit (as described in RCA Review, March 1948, page 107) is employed. The clamp circuit comprises diodes 48, 49, 50, 51 RC network including condenser 52, and resistor 53, and a transformer 54, the primary of which is connected to the output of pulser 27. A network comprising condenser 55 and resistor 56 couples the clamp circuit to the output of amplifier 18. When pulses are applied from pulser 27 to the grid 12 of the camera tube 10 and to the transformer 54 of the clamp circuit, the diodes conduct allowing condenser 22 to charge to the peak potential of the signal present at point P′ or to discharge through resistor 56 if the potential across condenser 22 is higher than the potential at point P′. During the interval between pulses, the condenser 22 maintains its potential since the diodes are non-conductive. It will be noted that potential source 57 has been added to allow operation of the Vidicon with a negative potential on the signal plate 13. Of course potential source 34 must render the cathode 11 considerably more negative than the signal plate 13.

The disclosed embodiments are merely illustrative of the principles of the invention and should not be construed as limiting. Any circuit which averages the peak amplitudes of the output current pulses may be employed. Basically, this circuit includes a device which produces a potential corresponding to the amplitudes of the individual pulses, which maintains a potential between pulses substantially the same as the potential produced by the preceding pulse, and which varies in potential according to increments or decrements of potential of successive pulses.

What I claim is:

1. A system for increasing the signal to noise ratio of the output of a storage camera tube operable at low scanning rates comprising a storage camera tube having a photosensitive target upon which a light image may be projected to form thereon an image of the same in incremental area charges, means to produce an electron beam projected upon the photosensitive target, a grid for controlling the intensity of said electron beam and means to cause said electron beam to progressively scan said photosensitive target incremental area by incremental area to successively discharge the same, in combination with a means connected to said grid to pulse the intensity of said electron beam once for each incremental area scanned during the scanning thereof to produce at said incremental areas a high rate of change of the charge thereon, means coupled to the target to produce a voltage pulse with the discharge of each incremental area, and means connected to the last named means for integrating the voltage pulses to produce a voltage varying with the average voltage of said pulses, said latter voltage having a high signal to noise ratio.

2. A system for increasing the signal to noise ratio of the output of a camera storage tube operable at a low rate of scanning comprising a camera tube having a photosensitive target upon which the focusing of a light image will produce a charge image, the charge varying from incremental area to incremental area in accordance with the intensity of the light impinging on the incremental areas, means for progressively scanning said target with a pulsating electron beam the frequency of which will produce a pulse in the intensity of the electron beam for each incremental area scanned, means associated with said target for producing a voltage pulse for each incremental area scanned and of an amplitude proportional to the charge on each incremental area and means connected to said last named means for integrating said pulses to produce a voltage varying as the average amplitude of said pulses, said voltage representing a high signal to noise ratio.

3. In a television pickup tube, a target, means for producing a charge image in accordance with a light image focused thereon, the charge on each incremental area of said target being in accordance with the intensity of the light impinging thereon, electron beam means for progressively scanning said target means increment by increment and imposing on each incremental area a pulse train of electrons for discharging said incremental areas for a period that is constant from incremental area to incremental area, means associated with the target means responsive to the discharge of the incremental area to produce a succession of voltage pulses varying in amplitude in accordance with the charge on the incremental areas and means connected to said last named means for integrating said voltage pulses to produce a voltage signal representative of the average of the amplitude of said voltage pulses and in which there is a high signal to noise ratio.

4. A system for providing high signal to noise ratios in the output of a camera tube comprising a camera tube having target means upon which a light image may be projected to create a charge image thereon, the charge image constituted of incremental area charges, each varying in accordance with the intensity of the light impinging thereon, means for impinging an electron beam on each of the incremental areas of said target for a period less than the period required for the beam to scan each incremental area whereby each incremental area is discharged at a rapid rate, means associated with said target means for producing a succession of voltage pulses each having an amplitude depending on the magnitude of the charge on each incremental area scanned, and means associated with said last named means for stretching the duration of said voltage pulses comprising a capacitor, means for charging said capacitor for the duration of said voltage pulse and isolating said capacitor at the conclusion of said voltage pulse, means for discharging said capacitor just prior to the imposition of succeeding voltage pulse means responsive to the charge on said capacitor for producing a voltage varying with the charge on said capacitor.

5. A system for providing high signal to noise ratios in the output of a camera tube comprising a camera tube having a target means upon which a light image may be projected to form a charge image thereon, the charge image constituted of incremental area charges, each varying in accordance with the intensity of the light impinging on the incremental areas, means for scanning the incremental areas by an electron beam, means for pulsing said electron beam for a period less than the period required for the beam to scan each incremental area, means associated with said target means for producing a succession of voltage pulses each having an amplitude depending on the magnitude of the charge on each incremental area scanned, and means associated with said last named means for stretching the duration of said voltage pulses comprising, a capacitor, a source of voltage, a triode tube having a grid connected to the means associated with said target means and operable for the duration of the pulse to connect said source of voltage to said capacitor, a second triode having a grid and a plate circuit connected to said capacitor, means connected to the grid of said latter triode, to render it conductive for a short period prior to the instant when the first triode is rendered conductive for the purpose of discharging said capacitor and means connected to said capacitor for producing a voltage representative of the average charge on said capacitor.

6. A system for providing high signal to noise ratios in the output of a camera tube comprising, a camera tube having a target means upon which a light image may be projected to form a charge image thereon, the charge image constituted of incremental charge areas each varying in accordance with the intensity of the light impinging on the incremental areas, means for scanning said target by an electron beam incremental area by incremental area, means for pulsing the intensity of the electron beam once for each incremental area scanned and for a period less than the period required for the beam to scan the incremental area, means associated with said target means for producing a succession of voltage pulses each having an amplitude depending on the magnitude of the charge on each incremental area scanned, and means associated with said last named means for stretching the duration of said voltage pulses comprising, a capacitor, a source of voltage, a pentode tube connected in series between said capacitor and said source of voltage, said pentode having a control grid connected to said means associated with said target for producing a series of pulses and controlled thereby to determine the degree of conductivity of said pentode in accordance with the amplitude of said voltage pulses, a second grid of said pentode connected to the means for pulsing the intensity of the electron beam for conditioning said pentode to conduct only for the duration of said pulse, a pair of diodes connected to said capacitor and means connected to said means for pulsing the intensity of the electron beam for keying said diodes to conductivity just prior to the succeeding pulse of beam intensity to discharge said capacitor, and means responsive to the average voltage of said capacitor to produce a voltage carrying according to the average voltage of said capacitor.

7. A system for providing a high signal to noise ratio in the output of a camera tube having a low scanning rate comprising, a camera tube having an electron gun producing an electron beam, a grid for controlling the intensity of said electron beam, a photosensitive target and a signal plate associated therewith, means to cause said electron beam to scan said photosensitive target incremental area by incremental area, means connected to said grid for imposing a pulsating voltage on said grid, the frequency of which is such as to vary the intensity of the electron beam through a maximum intensity once for each incremental area scanned to thereby produce a pulsating signal voltage from the signal plate associated with said target, a capacitor, means connecting said signal plate and said capacitor for altering the charge thereon in accordance with the amplitude of the pulsating voltage from the signal plate and means responsive to the average charge on said capacitor.

References Cited in the file of this patent

UNITED STATES PATENTS

| | | |
|---|---|---|
| 2,084,700 | Ogloblinsky | June 22, 1937 |
| 2,222,957 | Shelley | Nov. 26, 1940 |
| 2,241,204 | Keyston | May 6, 1941 |
| 2,272,842 | Hickok | Feb. 10, 1942 |
| 2,657,258 | Hester | Oct. 27, 1953 |
| 2,689,271 | Weimar | Sept. 14, 1954 |
| 2,706,219 | Weighton | Apr. 12, 1955 |